US007787486B2

(12) United States Patent
Vestal

(10) Patent No.: US 7,787,486 B2
(45) Date of Patent: Aug. 31, 2010

(54) METHOD AND SYSTEM FOR ACHIEVING LOW JITTER IN REAL-TIME SWITCHED NETWORKS

(75) Inventor: Stephen C. Vestal, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 748 days.

(21) Appl. No.: 11/598,288

(22) Filed: Nov. 13, 2006

(65) Prior Publication Data

US 2008/0112439 A1 May 15, 2008

(51) Int. Cl.
*H04B 7/212* (2006.01)
*H04J 3/06* (2006.01)
(52) U.S. Cl. .................... 370/442; 370/503
(58) Field of Classification Search .......... 370/347, 370/350, 428, 442, 444, 445, 503, 516
See application file for complete search history.

(56) References Cited

U.S. PATENT DOCUMENTS

| 4,680,582 | A * | 7/1987 | Mejia .................... 340/3.21 |
| 6,567,840 | B1 | 5/2003 | Binns et al. |
| 7,194,010 | B2 * | 3/2007 | Beasley et al. .............. 370/503 |
| 7,319,688 | B2 * | 1/2008 | Shpak ....................... 370/338 |
| 7,454,218 | B2 * | 11/2008 | Mo et al. ................... 455/502 |
| 2004/0208158 | A1 | 10/2004 | Fellman et al. |
| 2005/0138666 | A1 * | 6/2005 | Narusawa et al. ............ 725/89 |
| 2007/0070936 | A1 * | 3/2007 | Stamoulis et al. ........... 370/328 |
| 2007/0071026 | A1 * | 3/2007 | Rogers ....................... 370/458 |

OTHER PUBLICATIONS

Shlomi Dolev and Jennifer L. Welch, "Self-Stabilizing Clock Synchronization in the Presence of Byzantine Faults," Journal of the ACM, vol. 51, No. 5, Sep. 2004, pp. 780-799.
Condor Engineering, Inc., "AFDX/ARINC 644 Protocol Tutorial (1500-049)," Condor Engineering Inc., Santa Barbara, CA 93101, Document Revision: May 2005, Document Version: 3.0.
Ozalp Babaoglu and Rogerio Drummond, "(Almost) No Cost Clock Synchronization," (Preliminary Version), Proceedings of the 17th Int Symp on Fault-Tolerant Computing, 1987, pp. 42-47.
Emmanuelle Anceaume and Isabelle Puaut, "A Taxonomy of Clock Synchronization Algorithms," Institut De Recherche En Informatique Et Systemes Aleatoires, Publication Interne No. 1103, Jul. 1997, 25 pages.

(Continued)

*Primary Examiner*—Kevin C Harper
*Assistant Examiner*—Xavier Szewai Wong
(74) *Attorney, Agent, or Firm*—Fogg & Powers LLC

(57) ABSTRACT

A method and system for increasing the precision of time synchronization among a plurality of host nodes in a packet-switched network by reducing transmission delay variation in the network. Each host node is provided with a distinct set of transmission times selected from a global schedule in such a way as to avoid concurrent transmission of messages by the plurality of host nodes. The transmission times may be determined as offsets within a global hyperperiod, and each host node carries out transmissions according to predetermine offsets the respective host node. Transmissions according to offsets may be applied to real-time messages, including time-synchronization messages, hence yielding increase precision of synchronization.

20 Claims, 4 Drawing Sheets

OTHER PUBLICATIONS

Fred B. Schneider, "A Paradigm for Reliable Clock Synchronization," Department of Computer Science, Cornell University, Ithaca, NY 14853, http://www.cs.cornell.edu/fbs/publications/byzClockBandol.ps, Apr. 1986.

Barbara Simons, Jennifer Lundelius Welsch and Nancy Lynch, "An Overview of Clock Synchronization," http://faculty.cs.tamu.edu/welch/papers/lncs90.pdf, Aug. 23, 1988.

Hermann Kopetz and Gunther Bauer, "The Time-Triggered Architecture," to appear in "Proceedings of the IEEE Special Issue on Modeling and Design of Embedded Software," Oct. 2002.

Leslie Lamport and P.M. Melliar-Smith, "Byzantine Clock Synchronization," ACM 0-89791-143-1,1984 pp. 68-74.

Nancy Lynch, "Time Synchornization," courses.csail.mit.edu/6.885/spring06/lect6.pdf., Feb. 27, 2006.

Yoshiaki Kitaguchi et al., "Research of Advanced Time Synchronous System With Network Support," Communications, Computers and Signal Processing, 2003, PACRIM, 2003 Pacific Rim Conference, vol. 2, pp. 1036-1039, http://www2.nict.go.jp/w/w114/stsi/old_tag/pdf/e20030830.pdf.

Barbara Liskov, "Practical Uses of Synchronized Clocks in Distributed Systems," 1991 ACM 0-89791-439-2/91/0007/0001.

Mills, D.L., "Internet Time Synchronization: The Network Time Protocol," IEEE Trans. Communications COM-39, 10 (Oct. 1991), 1482-1493.

Fasbender A. et al., "On Assessing Unidirectional Latencies in Packet-Switched Networks", "IEEE International Conference on Montreal, Que., Canada", Jun. 1997, pp. 490-494, vol. 1, No. 8, Publisher: IEEE, Published in: New York, NY.

* cited by examiner

METHOD AND SYSTEM FOR ACHIEVING LOW JITTER IN REAL-TIME SWITCHED NETWORKS

FIELD OF THE INVENTION

The present invention relates to data communications in real-time switched networks, and more particularly to reducing transmission jitter of packets as they traverse switches in real-time switched networks.

BACKGROUND

A distributed real-time system comprises two or more subsystems that cooperatively function to carry out causally-related actions and tasks in synchronicity (or near synchronicity) with each other and with external events or dynamical states that are themselves, in turn, causally related in some way to the actions and tasks of the subsystems. The aspects of the system that make it real-time are the causal relationships of the actions and tasks of the respective subsystems, and the causal interactions of the subsystems with the external events and dynamical states "as they happen."

In carrying out the actions and tasks, the subsystems exchange information with one another, and may interact directly or indirectly with the external events or dynamical states. Interactions between a subsystem and external events or dynamical states may include detecting, measuring, or reacting to events or changes in state, and/or causing or influencing events or changes in state, for example. Information exchanged between subsystems may include sending and/or receiving notifications or measurements of external events or dynamical states, and/or conveying signals or messages that cause the receiving subsystem(s) to interact with the external environment in some way, for instance. Hence, a subsystem typically comprises one or more components that interact (directly or indirectly) with the external environment, and one or more components that facilitate communication with one or more other subsystems. A subsystem may comprise other elements as well.

In a distributed real-time system in which two or more of the subsystems comprise some form of computing platform, including a processor and a network interface for external communications, those particular subsystems, referred to a generically as end systems, are typically interconnected by a communication network. Functioning as it does to support communication between end systems of a distributed real-time system, such a network is referred to as a real-time network. That is, a real-time network is one that communicatively connects end systems of a distributed real-time system. The information exchanged between end systems in the service of the real-time functionality in a real-time system is carried over the real-time network in the form of messages, referred to as real-time messages.

One example of a distributed real-time system and network is a distributed, multi-participant, interactive computer video game, in which a network of computer stations generates a synthetic environment concurrently presented in an identical evolutionary state on each station to a participant at that station. Each participant may interact through the computer station with the synthetic environment presented at his or her station, and the resulting, temporally-sequenced, concurrent interactions of all of the participants, exchanged in real-time messages, are used to synchronously update the synthetic environments rendered at each computer station.

Another example of a real-time system and network is an avionics subsystem, in which a network of end systems controls various flight-control and stabilization functions of an aircraft. For instance, one of the end systems may comprise actuators which, under computer control, cause a certain wing surface to move, while another one of the end systems may comprise a computer that converts user input, such as continuous movement of a control lever, into a sequence of commands to move the wing surface, and synchronously sends the commands in real-time messages via the network to the first end system in order to cause the wing surface to move in synchronicity with the continuously-changing user input. Other end systems may continuously measure environment variables, such as air speed or aircraft attitude, and continuously (and synchronously) transmit the measurements in real-time messages via the network to other end systems, which in turn use the measurements as feedback to flight-control functions that then synchronously effect, through commanded flight-control actions, the environment variables being measured. These examples are illustrative only, and many other are possible.

In both the computer-video game example and the avionics subsystem example above, correct operation of the real-time system requires, first, that transmissions of real-time messages between end systems are timely, in order for the respective end systems to keep pace with each other and with the external events and dynamical states, and, second, that the causal relationships of the end systems' real-time messages with each other, as well as the causal relationships between the end systems' actions and tasks and the external environment, are strictly maintained. The first requirement ultimately translates to requirements for the performance characteristics of the real-time network that interconnects the end systems. The second requirement translates to an additional requirement that all of the end systems must operate according to synchronized clocks. While failure to meet either of these requirements may result in incorrect operation of the real-time system, the consequences of incorrect operation are very different for the two example real-time systems. Clearly, in the case of an avionics subsystem, correct operation of the real-time system and network is critical at least for reasons of safety.

Real-time networks that support systems that perform critical functionality, such as safety-related applications, are referred to as hard real-time networks. The performance requirements of hard real-time networks are typically stated in terms of reliability as well as limits or bounds on transmission delay and on variations in delay of real-time messages. The requirement for synchronization of end-system clocks is typically stated in terms of precision, or tolerance of disagreement between clocks. The requirements for both the bounds on network performance and the precision of clock synchronization are determined according to the particular application of the real-time system in question.

The synchronization of end-system clocks in a real-time network may further require that all clocks are synchronized with each other and with an external global clock, such as that associated with a global positioning satellite (GPS) system, for example. Alternatively, a real-time system may only require internal synchronization among the end-system clocks, without the need for strict synchronization with an external global clock. In either case, the precision required is again determined by the particular application.

Synchronization may be achieved in a number of ways, but generally involves either direct distribution to each end system of a common clock source, for example via a hard-wired connection, or execution of a distributed synchronization algorithm on each end system. In the latter case, each end system periodically exchanges synchronization messages with some or all of the other end systems, wherein each message carries time stamp information generated by the sending end system, and is used by the algorithm of the receiving end system to compute an adjustment or correction to the clock of the receiving end system. Further in this case, the synchronization messages themselves comprise real-time messages of the real-time system, and hence the precision with which end system clocks may be synchronized is itself tied to the performance characteristics of the real-time network.

An important element in the design of a real-time network is the determinism of transmission delay of real-time messages between any two end systems, because it introduces a degree of predictability into the performance of the network, and thereby tends to increase the precision of the performance bounds of the network, as well the precision of the synchronization of end system clocks achievable by distributed synchronization algorithms. Conversely, variability in the transmission delay of real-time messages between end systems, commonly referred to as jitter, reduces the accuracy with which network performance (and performance bounds) may be determined, and hence tends to decrease the precision with which end-system clocks may be synchronized by distributed algorithms.

From the time that real-time messages are first generated by a source end system until they arrive at a destination end systems, there may be multiple sources of jitter. For example, variability in the processor load on the source end system may introduce jitter into the time consumed in the generation of identical or similar types of real-time messages, even before messages are presented to the network interface of the source end system for transmission on the network to the intended destination end systems. Further, the queuing of outbound messages in the network interface on the source end system may introduce jitter in the departure of real-time messages from the network interface. Once a real-time message begins traversing the network, various network elements along the message's path may then introduce transmission jitter.

SUMMARY

In a packet-switched network, messages are packetized at their source, and the packets may then traverse one or more store-and-forward network elements, such as switches and/or routers, as they travel to their destinations. Packet-switched networks, such as Ethernet-based networks, generally offer advantages in terms of cost, reliability, and maturity of technology, and for these reasons, among others, often serve as the foundation of hard real-time networks, including avionics subsystems, for example. In a switched real-time network, packets that carry real-time messages, either as complete messages or in fragments, are referred to as real-time packets. Network configurations in which each end system is uniquely connected to a separate port on a switch introduce the further advantage of eliminating contention on the transmission medium. However, switching elements typically incorporate packet queues to accommodate incoming packets from the multiple sources connected to the switch ports. Because the queuing of packets at switches tends to increase jitter in the transmission of packets in a packet-switched network, it is desirable to devise ways of reducing the variation in transmission delay experienced by real-time packets in packet-switched networks that are used for hard real-time networks.

Accordingly, the present invention is directed to a method and system for reducing transmission delay variation (or jitter) of real-time packets in a real-time switched network as they travel via the network between end systems of a real-time system. More particularly, a method and system is disclosed for generating and providing a global schedule to end systems of a real-time system, wherein the schedule is used for the transmission by the end systems of real-time packets via the connecting switched real-time network. By enabling the end systems to appropriately schedule their transmissions of real-time packets in the real-time network according to times selected from the global schedule, the probability that real-time packets will be queued at the switches they traverse can be reduced or possibly even eliminated. Consequently, transmission jitter experienced by real-time packets as a result of queuing at network switches may be reduced or eliminated as well. In turn, the reduction in transmission jitter suffered by real-time packets leads to increased precision of synchronization among the end systems, as well as generally improved performance characteristics of the real-time network.

Hence, in one respect, the invention is directed to a method and system for increasing the precision of synchronization among a plurality of end systems in a packet-switched communication network. Each end system, referred to generically as a host node, comprises a computing platform that is communicatively coupled with each of the other end systems (host nodes) by the network, and each has a clock that, among other possible functions, may be used for internal and external timing of actions and communications. In an exemplary embodiment, synchronization among the clocks on the host nodes is maintained by a synchronization program executing on each host node, wherein the each program instance comprises a logical component of a distributed synchronization algorithm. Examples of distributed synchronization algorithms that could be used in the present invention include the Network Time Protocol (NTP) and IEEE 1588, although others are possible as well.

In operation, the program instance executing on each host node preferably generates time-synchronization messages and exchanges the messages with program instances executing on one or more of the other host nodes. A given program instance on a given host node, upon receiving a time-synchronization message from another program instance on another host node, may use the information in the received message to adjust the clock on the given host node. The given program instance will preferably also generate and send time-synchronization messages to the other program instances on other host nodes so that they may likewise adjust the clocks on their respective host nodes.

The time-synchronization messages constitute real-time messages, and thus in accordance with the exemplary embodiment, each host node transmits its time-synchronization messages according to a distinct set of transmission times selected from a global schedule that is shared among all the host nodes. The selection of each host node's distinct set of transmission times is made in such a manner as to reduce or eliminate concurrent transmission of time-synchronization messages among the plurality of host nodes. In this way, time-synchronization messages from different host nodes will not (or are at least not likely to) arrive at network switches at the same time, thus eliminating (or reducing the likelihood of) queuing at network switches. In turn, queuing-related jitter suffered by time-synchronization messages is eliminated (or at least reduced), leading to a corresponding increase in the precision of the synchronization achievable by the distributed synchronization algorithm.

In practice, time-synchronization messages preferably include at least one time stamp inserted by the program instance that generates the message, as well as possibly other time-related information that indicates the actual time at which the message was transmitted from the source host node. For example, the synchronization program on the source host node may insert a time stamp when it generates a given time-synchronization message, and a network interface component of the source host node may insert an additional time stamp at (or near) the moment of transmission of the message from the interface onto the real-time network. Other additional or alternative information may be included in each time-synchronization message as well, including time stamps received in time-synchronization messages from other host nodes.

Preferably, the set of transmission times for each respective host node will be determined according to offsets within a global periodic transmission cycle, referred to as a hyperperiod. Thus the global schedule will comprise a hyperperiod of predetermined duration, and a sequence of offsets, each offset being shorter than the hyperperiod duration and each referenced to the start of the cycle. For example, the hyperperiod duration could be one second, and the offsets could be ten different integer multiples of one-tenth of a second, thus yielding ten distinct offsets per cycle of the hyperperiod: 0.0, 0.1, 0.2, . . . , 0.9 seconds. An exemplary set of transmission times for each respective host node would then be determined by selecting one or more offsets from the sequence and by setting a start time for the cycle. By avoiding duplicate selections of offsets among the plurality of host nodes, concurrent transmissions of time-synchronization messages may thus be avoided. In turn, the arrival at a network switch of time-synchronization messages from different end systems may be staggered in time, thus eliminating or reducing queuing of the messages at the switch. Note that the start time for the cycle may be specified relative to a synchronized clock tick (e.g., "on the second") rather than as an absolute global time.

As a further aspect of the exemplary embodiment, each host node could be either a client device or a server device in the real-time switched network. As such, client devices and server devices may respectively implement different functional elements of the distributed synchronization algorithm. Moreover, in communications between clients and servers, various client-server protocols may be used, including ones that are defined within or that facilitate the distributed synchronization algorithm.

Some or all of the host nodes may additionally be communicatively coupled to an external global time source, and may thus acquire a global time from that source. The global time may then be used as an absolute reference in the synchronization algorithm, for instance. An example of an external global time source that may be used in the present invention is one associated with a GPS system, although other possible external global time sources could be used as well. Synchronization among the host nodes may alternatively be maintained in a relative sense, if agreement of all the clocks with an external global time source is not required. Note that acquisition of a global time by some or all host nodes from an external global time source does not necessarily obviate the need for execution of a distributed synchronization algorithm as well.

By enabling the host nodes to perform the scheduling of transmissions of time-synchronization messages, the present invention can be implemented in any of a number or packet-switched networks without the need to introduce changes or modifications to the underlying switch technologies. In a preferred embodiment, the switched real-time network is based on Ethernet technology, and includes at least one Ethernet switch. It should be noted, however, that the present invention could also be enabled in a switched real-time network that is based on other existing technologies, as well as possibly emerging, planned, or future technologies.

In another respect, the invention is directed to a method and system for reducing transmission delay variation of packet transmissions among a plurality of end systems in a packet-switched communication network. Again, each end system is referred to as a host node, each comprises a computing platform that is communicatively coupled with each of the other end systems (host nodes) by the network, and each has a clock that may be used for internal and external timing of actions and communications. Preferably, the clocks on the all the host nodes will be synchronized with each other, possibly through a distributed synchronization algorithm, as described above or alternatively by distributing a common time source to the clock on each host node, for example.

The plurality of host nodes may comprise a real-time system, and as such, the packet-switched network is a switched real-time network, and one or more logical components of one or more distributed real-time programs may be executing on each host node. The data packets that are exchanged between host nodes in the service of the one or more distributed real-time programs constitute real-time packets, and thus, in accordance with the present embodiment, each host node transmits its real-time packets according to a distinct set of transmission times selected from a global schedule shared among all the host nodes. Again, the selection of each host node's distinct set of transmission times is made in such a manner as to reduce or eliminate concurrent transmission of real-time packets among the plurality of host nodes. In this way, real-time packets from different host nodes will not (or are at least not likely to) arrive at network switches at the same time, thus eliminating (or reducing the likelihood of) queuing at network switches. In turn, transmission jitter of the real-time packets may be eliminated (or reduced).

Preferably, the global schedule will comprise a sequence of offsets within a hyperperiod, as described above. Further, the set of transmission times for each respective host node will again be selected from the sequence of offsets in the same manner as described above in connection with distributed synchronization. Thus, transmission times for each respective host node will correspond to offsets, wherein duplication of offsets among the plurality of host nodes is avoided in the selection process. As with transmission of synchronization messages, concurrent transmission of real-time packets will thus be eliminated or avoided, and the corresponding arrival at a network switch of real-time packets from different end systems may be staggered in time, eliminating or reducing queuing of the real-time packets at the switch.

Again, host nodes may additionally comprise client devices or server devices, with client-server protocols implemented in the service of the one or more distributed real-time programs. Further, as with the distributed synchronization algorithm, the real-time network used more generally for distributed real-time programs may comprise an Ethernet-based network that includes at least one Ethernet switch.

In still a further respect, the present invention is directed to the implementation of a system for reducing transmission delay variation in a switched real-time network. In a preferred embodiment, the system comprises a plurality of host nodes, wherein each host node in turn comprises a processor, data storage, a clock, and a network interface module. Further, each host node, which could be a client device or a server device, is communicatively coupled with every other host node via the switched real-time network, and the clocks on all the host nodes are synchronized with each other.

The processor on each respective host node may execute a software program (stored as instructions in the data storage of the host node) that comprises a logical component of a distributed real-time program. In exchanging real-time packets with logical components on the other host nodes, each respective host node communicates via the switched real-time network, sending and receiving real-time packets by way of the network interface module on the respective host node. On each respective host node, a distinct set of transmission times stored in the data storage of the respective host node will be used to determine the times at which the respective host node may transmit real-time packets on the network. As similarly described above, the distinct set of transmission times at each respective host node will be selected from a global schedule of transmission times, where the selections are made in such a manner as to avoid concurrent transmission of real-time packets among the plurality of host nodes.

Data reception software executing on the processor of each respective host node preferably operates in cooperation with the network interface module to deliver incoming real-time packets to the logical component executing on the processor of the respective host node. Similarly, data transmission software executing on the processor of each respective host node operates in cooperation with the network interface module to transmit real-time packets that have been generated by the logical component executing on the processor of the respective host node.

As with the other aspects of the present invention described above, the global schedule will comprise a sequence of offsets within a hyperperiod, and the set of transmission times for each respective host node will similarly correspond to one or more of the offsets. Duplicate selections of offsets among the host nodes will again be avoided.

As a further aspect of the exemplary embodiment of a system implementation, the distributed real-time program executing across the logical components on each host node may comprise a distributed synchronization program. As such, the logical component executing on each host node will be operable to adjust the clock on the respective host node, and further, the real-time packets exchanged between host nodes will comprise time-synchronization messages. Thus, upon reception at a given host node, a time-synchronization message will be delivered to the synchronization program executing on the given host node. As described above, the distributed synchronization program preferably comprises a distributed algorithm, such as NTP or IEEE 1588, for example.

Again, as similarly discussed above, one or more of the host nodes of the system may be communicatively coupled to an external global time source, such as that associated with a GPS system, and may thus acquire a global time. Further, the packet-switched network of the exemplary implementation of the real-time system is preferably based on Ethernet, and includes at least one Ethernet switch.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

Overview

Figure 1:
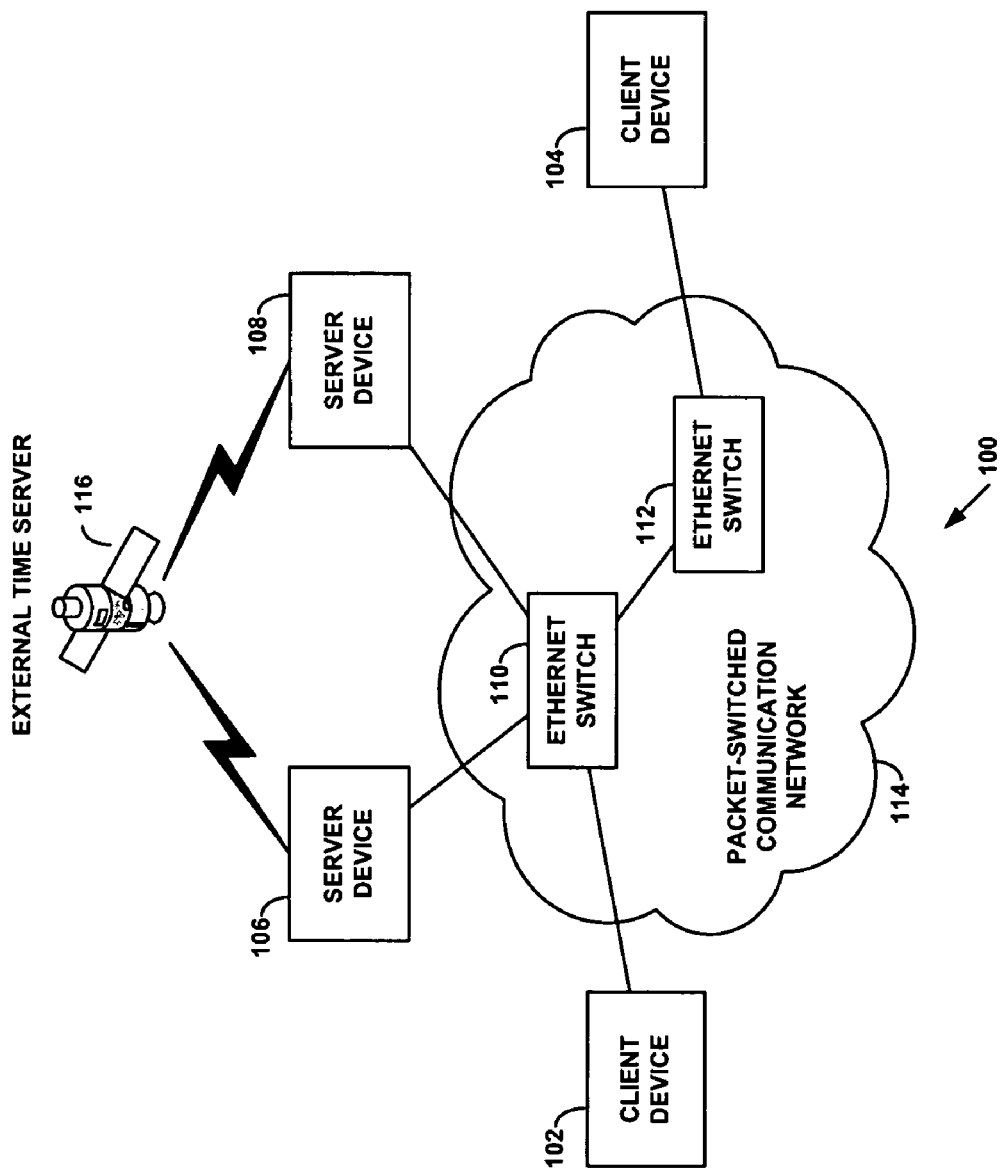
FIG. 1 is a simplified representation of a packet-switched network in which low-jitter transmission of packets may be carried out.

FIG. 1 illustrates a simplified exemplary packet-switched network 100 in which low-jitter transmission of packets could be carried out. By way of example, network 100 includes two Ethernet switches 110 and 112, two client devices 102 and 104, and two server devices 106 and 108. Also by way of example, client device 102 and server devices 106 and 108 are connected to Ethernet switch 110, while client device 104 is connected to Ethernet switch 112. This particular arrangement is illustrative only, and other configurations of connections are possible. It should be understood that other elements could be present in network 100, and that the number and types shown in FIG. 1 are not intended to be limiting.

Exemplary network 100 also includes a communicative link between an external time server 116 and each of server devices 106 and 108. Connections between external time server 116 and other devices in network 100 are also possible. External time server 116 could be part of a GPS system for example, but other forms of external time servers could be used as well.

According to a preferred embodiment of the present invention, each of client devices 102 and 104, as well as each of server devices 106 and 108 could be an end system in a real-time network. For example, each could comprise a computing platform on which is executing a synchronization program, wherein each program comprises a logical component of a distributed synchronization algorithm. Each program may in turn generate time-synchronization messages and transmit the messages to one or more of the other end systems.

In accordance with the preferred embodiment, each end system will transmit its messages according to a set of transmission times selected from a global schedule. In further accordance with the preferred embodiment, the selection of times from the global schedule will be made in such a way as to avoid duplication among the end systems represented in FIG. 1 by the client and server devices. As a consequence of each end system transmitting according to its own set of transmission times selected as described, each synchronization message will experience little or no queuing delay through Ethernet switches 110 and 112. Thus, transmission jitter will be eliminated (or nearly eliminated) in network 100.

In still further accordance with the preferred embodiment, transmissions by each end system according to predetermined transmission times as described for time-synchronization messages may be applied to all types of messages. In particular, the method may be applied to all real-time messages in order to reduce or eliminate transmission jitter in a real-time network.

Exemplary Operation in an Ethernet-Based Network

Figure 2:
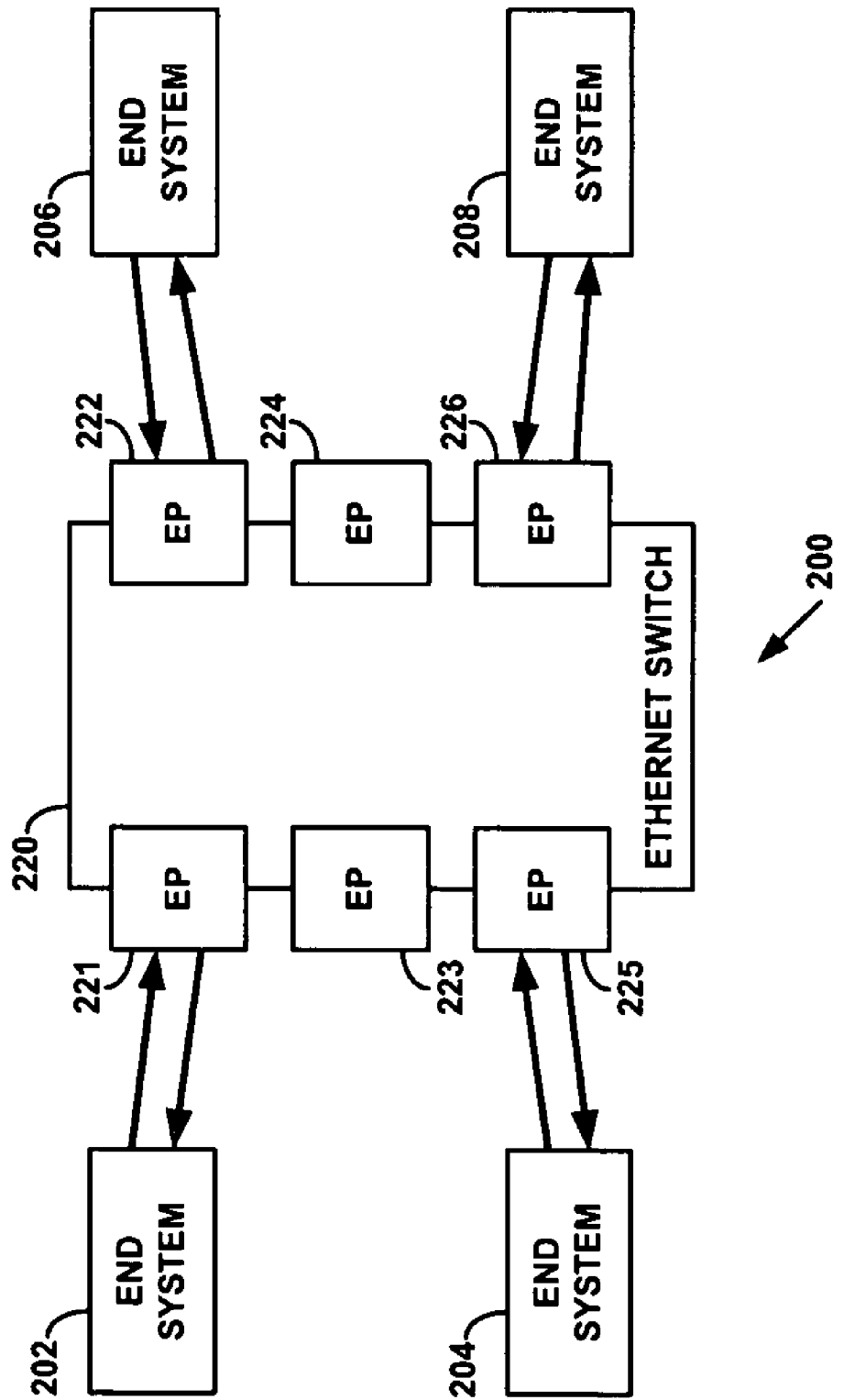
FIG. 2 is a simplified representation of an Ethernet-based network in which low-jitter transmission of packets may be carried out.

Exemplary operation of low-jitter transmission of packets in a packet-switched network may be further illustrated by considering a simplified view of an Ethernet switch, as shown in FIG. 2. By way of example, FIG. 2 depicts a network 200 comprising an Ethernet switch 220 and four representative end systems 202, 204, 206, and 208. Each end system comprises a computing platform (not shown) and a network interface (also not shown) for communicating with Ethernet switch 220. Ethernet switch 220 comprises a switching fabric (not shown) and six Ethernet ports, EP 221, 222, 223, 224, 225, and 226, to which end systems may connect (via their respective network interfaces), and through which end systems may communicate with each other. It should be understood that other end systems and switches could be present in network 200, and that the number and types shown in FIG. 2 are not intended to be limiting.

By way of example, end system 202 is connected to EP 221, end system 204 is connected to EP 225, end system 206 is connected to EP 222, and end system 208 is connected to EP 226. Also by way of example, EP 223 and 224 are both shown as having no connected end system or device. It should be understood that the configuration shown in FIG. 2 is illustrative only, and others are possible. For example, there could be more or fewer end systems, and there could be other types of devices connected to the Ethernet switch. Further, there could be more than one Ethernet switch, and each could have more or fewer Ethernet ports than the six illustrated on Ethernet switch 220.

Communication between end systems in network 200 is carried by Ethernet packets transmitted between end systems via Ethernet switch 220. Each end system preferably possesses a unique hardware identifier associated with its network interface. For example, an Ethernet Network Interface Card (NIC) typically used as a network interface for an end system (or similar device) is assigned a globally unique hardware identifier, referred to as its Media Access Control address (or just MAC, for short), when it is manufactured. Alternatively, an Ethernet (or other) network interface with a unique MAC address could be integrated with the end system (e.g., on the motherboard). Every Ethernet packet contains the MAC of interface of the transmitting source and the MAC of the interface of the intended destination system or device. The Ethernet switch uses the destination MAC in an Ethernet packet that it receives to properly forward the packet to the intended destination.

In operation, Ethernet switch 220 switches Ethernet packets received on the Ethernet port connected to a source end system to the Ethernet port connected to the destination end system, where the packet is then transmitted or forwarded to the destination end system. The process of switching an Ethernet packet from an inbound port to an outbound port involves matching the destination MAC of the arriving packet to the port known to be associated with that MAC. According to this process, the Ethernet switch (such as Ethernet switch 220) maintains a table (or other form of recorded information) that lists for each Ethernet port the MAC address of the connected device or system (such as end system 202, 204, 206, and 208). The switch then identifies the destination MAC of the packet with the port associated with that MAC as given in the table. The information in the table is typically learned dynamically by the switch during initial switching operations involving newly-connected devices, although other means are possible (e.g., static configuration of the switch). The actual act of switching a packet from an inbound to an outbound port may involve physically copying the packet from an input to an output memory buffer, for example, or alternatively manipulating memory address pointers so as to effectively convert an input memory buffer to an output memory buffer.

Ethernet technology, including protocol standards and switching/forwarding techniques and methods, are well-known in the arts. The brief description above and further discussion below are intended only to call attention to certain aspects of function and operation that are of particular relevance to the present invention. They are not intended to be complete descriptions, nor should any lack of completeness of the descriptions be construed as limiting the scope of the present invention.

Continuing with discussion of the exemplary network in FIG. 2, the connection between each end system and its respective Ethernet port is depicted as a pair of unidirectional arrows, one arrow of the pair directed from the end system to the respective Ethernet port and the other directed from the port to the end system. This depiction is meant to be representative a full-duplex communication connection. That is, Ethernet packets may be transmitted concurrently on each element of a given pair of arrows. For example, end system 202 could transmit Ethernet packets to EP 221 and concurrently receive Ethernet packets from EP 221. Correspondingly, EP 221 could concurrently receive Ethernet packets from end system 202 and transmit Ethernet packets to end system 202. Full-duplex communication is preferably carried out by all the end systems and Ethernet ports in network 200, or any similar packet-switched network exemplified by network 200.

In a typical switched network, such as network 200, any of the connected end systems (or similar devices) may transmit packets generally at any time. Consequently, the switch may receive inbound packets from multiple end systems concurrently, or at least at a rate that, from time to time, exceeds the rate at which it can switch inbound packets to outbound ports, and/or the rate at which it can transmit packets from outbound ports to their destinations. As a result, the switch may, at any given time, have to temporarily store multiple packets as it functions to switch them from inbound to outbound ports and on to their destinations. That is, the switch may have to place packets in a queue where they wait their turn to be switched and/or transmitted to their destination end system.

In practice, an Ethernet switch may comprise more than one queue, depending, for example on the sophistication of the switch and the varieties of network traffic that need to be accommodated in the particular network. As an example, a hard real-time network may transport both real-time packets and background, non-real-time packets. The former may be subject to strict timing constraints, as discussed above, while the latter may not. In such a network, the switch could implement two queues, one for each type of network traffic. Packets preferably carry information that would allow the switch to identify which of the two types traffic they represent. The switch will, in turn, place incoming packets into the appropriate queue based on the identification. Packets in, or arriving to, the real-time queue would be switched and transmitted before those in, or arriving to, the non-real-time queue. In some applications, it may even be possible to interrupt, or preempt, the in-progress transmission process of a non-real-time packet in order to expedite the transmission of a newly-arrived, real-time packet.

The use of two queues in this manner is representative of a technique generally referred to as priority queuing. Without loss of generality, operation of the present invention may be illustrated by considering exemplary embodiments in an Ethernet network, such as network 200, in which the switch (or switches), such as Ethernet switch 220, comprises just two priorities, as described above. It should be understood, however, that this description of priority queuing is exemplary, and other arrangements are possible. For instance, multiple priority levels could be assigned across multiple queues, and the method of assigning inbound packets to a particular queue could take account of dynamic conditions, such as the number of packets in each queue, and the mean waiting time in each queue, among other possible factors. The illustrative use of two priority levels in this discussion should not be viewed as limiting the scope of the present invention.

Because multiple end systems may be able to transmit packets at any time, the number of packets in one or another of the queues may vary in a random manner with time. Further, packets may vary in size (e.g., number of bytes), so the actual time required to fully transmit a packet will correspondingly vary. As a consequence, the expected delay that a given packet will experience from the time it arrives at an inbound switch port until it is transmitted from an outbound switch port may correspondingly vary with time, according to the number of packets already in the system when the given packet arrives and the time needed to complete any in-progress transmission. The instantaneous number of packets in the queues of a switch averaged over time, together with the average duration of the transmission process, may be used to determine a mean expected delay for newly-arriving packets. The statistical distribution of the mean delay, for example as measured by the variance of the mean, is then an indication of the range of delays that packets may experience, and as such, is an indication, in some sense, of the degree of unpredictability of the switching delay. As noted above, the variation in delay is also referred to as jitter.

According to a preferred embodiment of the present invention, each end system will have clock, such as a system clock associated with a processor, for example, for timing of internal and external events. Further, the clocks of all of the end systems will be synchronized with each other. The clock on each system (or some function associated with the time kept by the clock) will be used to control when the respective end system may transmit packets on the network.

More particularly, each end system will transmit real-time packets according to times selected from a global schedule, wherein the selection of transmission times is made in such a way as to avoid concurrent transmissions by any two or more of the end systems. By judiciously constructing the global schedule, as well avoiding making duplicate selections of transmission times from the global schedule, the timing of transmissions from multiple end systems may be arranged so that all real-time packets arriving at the switch will always, or nearly always, find the real-time queue empty. Thus each real-time packet that arrives at the switch will always, or nearly always, be the next in line for outbound transmission from the switch, and may begin transmission immediately if there is no transmission in progress when it arrives. In other words, the variation in delay through the switch (i.e., jitter) will be eliminated (or at least significantly reduced). Because the selected transmission times are used by the end systems to determine when to transmit real-time packets to the switch, the elimination (or reduction) of jitter through the switch is accomplished independently of any actions taken by the switch, and thus requires no design changes or modifications to the switch.

In further accordance with the preferred embodiment, the global schedule of transmission times could comprise a sequence of unique time offsets referenced with respect to a global hyperperiod. The hyperperiod defines a cyclic period that is common to all end systems and within which each end system has an opportunity to transmit packets on the network (i.e., to the switch or switches of the network). The offsets, each smaller than the hyperperiod, define the specific times within the hyperperiod at which end systems may transmit packets. (Note that offsets referenced in this way to a period (or hyperperiod) may alternatively be referred to as phase offsets, in view of the inverse relationship of period to frequency and the definition of phase as frequency offset.) Thus by providing each end system with one or more unique offsets from the sequence of offsets, together with the start time of the hyperperiod, each end system will be guaranteed at least one time interval within each hyperperiod during which it alone, among all the end systems, may transmit a packet. Each packet transmitted in this way (i.e., according to an offset referenced to the hyperperiod) will then arrive at the switch and be processed without any queuing delay. Consequently, the variation in delay through the switch, or jitter, may be reduced or eliminated.

As a matter of practice, the start time associated with the hyperperiod will preferably be a relative time, referenced, for example, relative to a clock tick. For instance, "on the second," or "on the millisecond" could define the start of a hyperperiod without specifying an absolute time. Further, the offsets could be incremental integer multiples of a fixed-size offset increment that is itself computed as an integer subdivision of the hyperperiod. By way of example, a hyperperiod could be one second referenced to "on the second," and the offset increment could be 0.1 second. Thus, a global sequence of ten incremental offsets would be 0.0, 0.1, 0.2, . . . , 0.9 seconds, where 0.0 second is aligned with integral one-second clock ticks. Each end system would then be assigned one or more of the offsets, again with duplicate assignments being avoided. Note that this example should not be viewed as limiting, and other offset-schedules are possible. For instance, the hyperperiod could be 0.1 second referenced to the 0.1 second clock tick, with 100 incremental offsets, each an incremental integer multiple of a one millisecond offset increment. Other offset increments are possible as well.

The duration of the hyperperiod and the size and number of offsets will preferably be determined, at least in part, according to the number of end systems in the network, the statistical characteristics of end system transmissions (distribution of rates, packet sizes, etc.), the maximum switching rate (i.e., transmission bit-rate through the switch from arrival to departure with no queuing), network bandwidth, precision of the clock at each end system, and precision with which clock synchronization among the end systems may be achieved and maintained. The degree to which switch-transmission jitter may be reduced will similarly be dependent, at least in part, on some or all of these factors as well. For example, a unique set of time offsets for each end system is possible only if there are at least as many offsets per hyperperiod as there are end systems. If this condition does not hold, then a one or more particular offsets may have to be shared among two or more end systems. In this case, the likelihood of two or more end systems transmitting packets at the same time, and the corresponding likelihood of queuing at the switch may still be smaller than that in the absence of offset scheduling of transmissions, but it might not be reduced to zero.

As another example, if the offset increment is smaller than the time required by the switch to process the largest packet (i.e., the time from receiving it at an input port until fully transmitting it from an output port), then the probability that a packet will arrive at the switch before a current transmission completes may still be small, but not zero. Thus there could still be jitter due to the small but non-zero chance that arriving packets will have to wait for in-progress transmissions to complete. While this probability could be reduced or eliminated by increasing the size of the offset increment, other constraints may exclude this option. Hence, some or all of the factors listed above, as well as possibly others, may need to be considered in computing the duration of the hyperperiod and the increment size and number of offsets.

In practice, the generation of the global schedule, whether according to offsets or some other formulation, and the selection from the schedule of transmission times for each end system in switched network could be accomplished in a number of ways. For example, both schedule generation and time selections could be carried out by a network operator as part of a network configuration procedure on a network management station. According to such a procedure, the transmission characteristics of the end systems, such as the statistical distributions of transmissions in time and packet size, together with the number of end systems, critical time constraints on transmission delay, network bandwidth, and possibly other factors, could be used to determine an optimum global schedule. For instance, for the method of time offsets, the optimum global schedule could be one that maximizes the number of offsets while minimizing the probability queuing at the switch. The procedure also preferably includes selection from the global schedule of a set of transmission times for each end system, where, as described above, duplicate selections are avoided. Once the selections are made, each end system would then be provided with its respective set of transmission times, for instance, in the form of a file downloaded from the network management station.

Alternatively, the configuration procedure could be run automatically by the network management station, for instance, using information collected via queries to each end system. As still a further alternative, the configuration procedure could be run on one or more of the end systems. These are just a few examples of how the global schedule could be generated and the transmission times selected and provided to each end system. It should be understood that other methods could be used in the present invention.

Once each respective end system acquires its set of transmission times, the times in the set could be used by the network interface of the respective end system in order to ensure that transmissions are made in compliance with the times in its set. For example, a software-enabled control element inserted between appropriate layers of the protocol stack of the Ethernet network interface (e.g., a so-called "shim") could operate to gate outbound transmissions according to one or more times in the set of transmission times. Other methods of enabling scheduling of transmissions by the end system are also possible, and this example should not be viewed as limiting the scope of the present invention.

Exemplary Application to Precision of Synchronization

The precision of the individual end system clocks and the precision with which synchronization among end system clocks may be achieved and maintained may themselves be related to the degree to which jitter may be reduced. For example, for the method of time offsets described above, the smallest sized clock tick that can be accurately maintained must be smaller than the offset increment (i.e., the offset increment must be resolvable by the clock tick). Similarly, the maximum size of the disagreement between clocks must also be smaller than the offset increment. As discussed above, synchronization of clocks among end systems may be maintained through a distributed synchronization algorithm, wherein each end system executes a program that comprises a component of the distributed algorithm. (It should be noted that the component executing on each end system could correspond to identical forms of algorithms, or to different, possibly complementary, forms of algorithms, such as master-slave algorithms.) The program instance on each respective end system exchanges time-synchronization messages with one or more of the other program instances executing on the other end systems, and may adjust the clock on the respective end system according to analysis of one or more time-synchronization messages received from other end systems. Each time-synchronization message carries time-stamp information that is indicative of the time at which the message was generated and/or transmitted, as measure by the end system that generated and transmitted the message, as well as possibly time stamp information supplied in messages received from other end systems. Unpredictability of the transmission delay between the sending end system and the receiving end system, for example, as results from jitter, may reduce the usefulness of the time-stamp information, and hence, possibly, the precision achievable by distributed synchronization algorithms.

In order to illustrate how jitter may affect the precision of synchronization among end systems, a simple example calculation is presented. This calculation is representative of distributed synchronization, and it should be understood that its somewhat simplistic form herein, as well as omission, for the sake of brevity, of more complex details of known methods should not be viewed as limiting the present invention.

In this example, two end systems, A and B, exchange a time-synchronization message. The message exchange, beginning with the message being sent from A to B and ending with the message being returned from B to A, comprises a transaction. Time stamp information is accumulated and inserted into the message during the transaction, and allows A to compute an estimate of the relative offset between its clock and B's clock at the end of the transaction (this offset between clocks should not be confused with the offsets used in scheduling end system transmissions discussed above). The offset between A's and B's respective clocks represents a disagreement between the clocks, and may be used by A, for example, to adjust its clock so as to bring it into agreement with B's clock.

In practice, there will be multiple transactions between A and B, each transaction proceeding as follows. First A generates a time-synchronization message and inserts a first time stamp indicating the current time as measured by its clock, then sends the message to B. Let the first time stamp be $T_{A1}^i$, where the subscript A indicates A's clock as the source, the superscript i indicates the ith transaction, and the number one is the message number index (the first message, in this case). For the purposes of this example, the processing time at A will be ignored, so that the first time stamp represents the time, according to A's clock, at which the message is transmitted by A. Next, upon receiving the synchronization message from A, B inserts a second time stamp that corresponds to the time of receipt at B according to B's clock. Let the second time stamp be $T_{B2}^i$, where the meaning of the subscript and superscript is similar to that for the first time stamp. Then, after a time $\Delta T_B^i$, for example for processing, B inserts a third time stamp, $T_{B3}^i$ and returns the time synchronization message to A. As with the first time stamp, $T_{B3}^i$, corresponds to the time, according to B's clock, at which the message is transmitted by B. Finally, upon receiving the return message from B, A generates a fourth time stamp, $T_{A4}^i$, corresponding to the time of receipt at A according to A's clock.

With these four time stamps, A may now calculate for this (the ith) transaction the round-trip delay of the message between A and B, and can also the estimate offset between its clock and B's clock. The total transaction time measured by A's clock, $\Delta T_A^i$, is the time between A's transmission of the message to B and its receipt of the return message from B, that is, $\Delta T_A^i = T_{A4}^i - T_{A1}^i$. Let the round-trip delay for the ith transaction be $\delta_i$. Since the message spent $\Delta T_B^i$ at B and $\delta_i$ in transmission, it follows that $\Delta T_A^i = \Delta T_B^i + \delta_i$, or the ith total transmission delay is $\delta_i = \Delta T_A^i - \Delta T_B^i$.

Next, let $\theta_i$ be an estimate of the true clock offset calculated from the time stamps of the ith transaction. That is, on the ith transaction, A's clock is estimated to be running $\theta_i$ ahead of B's clock (note that if $\theta_i$ turns out to be negative, then A's clock would actually be running behind B's clock). With the assumption that the transmission delay from A to B is equal to the delay from B to A (or each delay is to $\frac{1}{2}\delta_i$), $\theta_i$ may be calculated as follows. The message sent by A to B is received at $T_{B2}{}^i$ according to B's clock. At this time on B's clock, A's clock will read $T_{A1}{}^i + \theta_i + \frac{1}{2}\delta_i = T_{B2}{}^i$. That is, A's clock, already running an estimated $\theta_i$ ahead of B's clock, will have advanced by $\frac{1}{2}\delta_i$ since A transmitted the message. Similarly, the message returned by B to A is received at $T_{A4}{}^i$ according to A's clock, at which time B's clock will read $T_{B3}{}^i - \theta_i + \frac{1}{2}\delta_i = T_{A4}{}^i$. I.e., B's clock, running an estimated $\theta_i$ behind A's clock, will have advanced by $\frac{1}{2}\delta_i$ since B sent the return message to A. Eliminating $\frac{1}{2}\delta_i$ in the two expressions for $T_{B2}{}^i$ and $T_{A4}{}^i$, and rearranging terms, yields $\theta_i = \frac{1}{2}(T_{B2}{}^i - T_{A1}{}^i + T_{B3}{}^i - T_{A4}{}^i)$.

Since the estimated offset $\theta_i$ is based on the assumption that the delays between A and B are symmetric (i.e., equal to $\frac{1}{2}\delta_i$), the accuracy with which $\theta_i$ estimates the true offset depends, at least in part, on the validity of this assumption. Among the factors that would tend to invalidate (or at least lessen the validity of) this symmetry assumption is transmission jitter. For example, according to the preferred embodiment, the message sent from A to B, as well as the return message from B to A, will traverse a switch. If the switch introduces queuing jitter, then an otherwise symmetric delay may be rendered asymmetric. In this case, the symmetry assumption becomes invalid and $\theta_i$ correspondingly becomes a less accurate estimate of the true offset between A's clock and B's clock. As the accuracy of the estimate decreases, so does the precision with which A's clock and B's clock may be synchronized, since the estimated offset is used to adjust one or the other of the clocks in order to bring them as close as possible into agreement.

The way in which jitter may impact the estimate for $\theta_i$ can be understood by relaxing the assumption of symmetric delay between A and B, and considering the relationship between $\theta_i$ and the true (but possibly un-measurable) offset, $\Theta$. Let x be the true delay from A to B, and let y be the true delay from B to A. That is, x and y represent transmission delays when there is no jitter. By reasoning similar to that discussed above, the true delay from A to B may be expressed as $x = T_{B2}{}^i - T_{A1}{}^i - \Theta$. Further, since x must be positive, it follows that $T_{B2}{}^i - T_{A1}{}^i \geq \Theta$. Applying this reasoning to y, the true delay from B to A, it similarly follows that $T_{B3}{}^i - T_{A4}{}^i \leq \Theta$. These two inequalities may be combined to yield $T_{B3}{}^i - T_{A4}{}^i \leq \Theta \leq T_{B2}{}^i - T_{A1}{}^i$, which represents a bounds on $\Theta$. Then, using the two expressions above that relate $\theta_i$ and $\frac{1}{2}\delta_i$ in terms of $T_{B2}{}^i$ and $T_{A1}{}^i$ and in terms of $T_{B3}{}^i$ and $T_{A4}{}^i$, respectively, the bounds on $\Theta$ can be expressed as $\theta_i - \frac{1}{2}\delta_i \leq \Theta \leq \theta_i + \frac{1}{2}\delta_i$. In other words, for any given transaction, the true value of the offset between clocks, $\Theta$, is bounded by a region of width $\delta_i$ and centered on the estimated value, $\theta_i$.

Over the course of many transactions (e.g., N transactions), the observed distribution of $\delta_i$ (that is, $\delta_i$ for i=1, . . . , N transactions) will yield a statistical measure of the bounds that may be placed on $\Theta$. That is, the bounds correspond to the precision with which $\Theta$ may be determined through repeated transactions and corresponding computations. Since transmission jitter may represent a major, if not dominant, contribution to the variation among derived values of $\delta_i$, jitter may therefore correspondingly represent a major, if not dominant, factor in the achievable bounds on $\Theta$. Consequently, jitter may play a predominant role in the precision with which the clocks at A and B may be synchronized. The greater the variance of the distribution of $\delta_i$, the broader the bounds on $\Theta$, the greater the uncertainty of the value of $\Theta$, and hence the lower the achievable synchronization precision. Conversely, the smaller the variance of the distribution of $\delta_i$, the narrower the bounds on $\Theta$, and hence the higher the achievable synchronization precision.

In practice, many transactions similar to the exemplary one above may be carried out between two or more end systems as part of a distributed synchronization algorithm. Further, there may be additional time stamps used in the calculations of clock adjustments, and the calculations may vary in detail. Additionally, there may be other types of information included in the time-synchronization messages besides time stamps. In accordance with preferred embodiments of the present invention, time-synchronization messages will be transmitted by end systems according to times selected from a global schedule, as described above. As a consequence, these messages will suffer little or no transmission jitter in the switch (or switches) of the network. The calculations presented above illustrate how the present invention may thus be used to advantageously to increase the precision of synchronization. It should be understood that the calculations are exemplary of distributed synchronization methods, and the advantageous use of the present invention is not limited by the particular calculations, variables, or associated algorithms. Moreover, the present invention may be applied to any message or messages transmitted by an end system, similarly resulting in an advantageous reduction or elimination of transmission jitter.

Exemplary Application to an Avionics Full-Duplex System

The present invention may be enabled in a hard real-time switched network in order to advantageously yield reduction or elimination of transmission jitter for both general real-time messages, as well as time-synchronization messages that may, in turn, be used to establish and maintain highly-precise synchronization of end system clocks in the network. By way of example, such a network could comprise a standards-based Avionics Full-Duplex system, or AFDX system (also referred to as ARINC standard 664, part 7, which is hereby incorporated by reference). AFDX builds upon basic full-duplex Ethernet technology, but adds certain elements and modifications that introduce enhanced reliability and performance characteristics requisite of a hard real-time system. In the following discussion, a simplified view of an AFDX system is presented in order to describe exemplary enablement of the present invention in such a system. AFDX systems are well-known in the art, and the discussion is not intended to be complete, nor should any lack of completeness of the description be construed as limiting the present invention.

AFDX, while based on standard full-duplex Ethernet, introduces a logical partitioning of network transmission links through a construct termed a virtual link (VL). Each virtual link has one and only one source end system, but may have multiple destination end systems. Further, a given end system may be the source of multiple virtual links, each link carrying real-time packets and each being fed by one or more component sources, such as programs or applications. Each end system may also receive real-time packets on one or more virtual links, each VL originating at one of other end systems. In practice, each VL has an associated maximum transmission rate, wherein the aggregate input to a given VL from all component sources at the source end system cannot exceed the maximum rate. Further, the aggregate rate of all VLs in a system must not exceed some system-level threshold rate.

All Ethernet packets that travel via a VL in an AFDX network contain usual header information, such as source and destination MAC addresses, but also include a VL identifier that is used by the source end system for aggregation, routing, and rate-control of output packets, by the Ethernet switch for destination routing, and by the destination end system for delivery of incoming packets. In a given AFDX system, virtual links are pre-configured according to the sources and destinations of the real-time packets, the requisite data transmission rates for each type of real-time traffic, the aggregate rate for each VL, and the available network bandwidth, as well as other possible factors. Proper configuration ensures correct operation of the real-time network, although it does not necessarily guarantee that transmission jitter will be absent.

Since AFDX systems are used in applications requiring hard real-time networks, the functions of each end system, as well as the critical communications and communication paths, are generally determined as a matter of design. Consequently, the operation and performance of the Ethernet switch (or switches) may be optimized according to known and/or predetermined routing. In particular, since the sources and destinations of all VLs are determined as part of the network design, switching may be accomplished using VL identifiers, wherein VL-based input-to-output port mapping may be statically configured.

Figure 3:
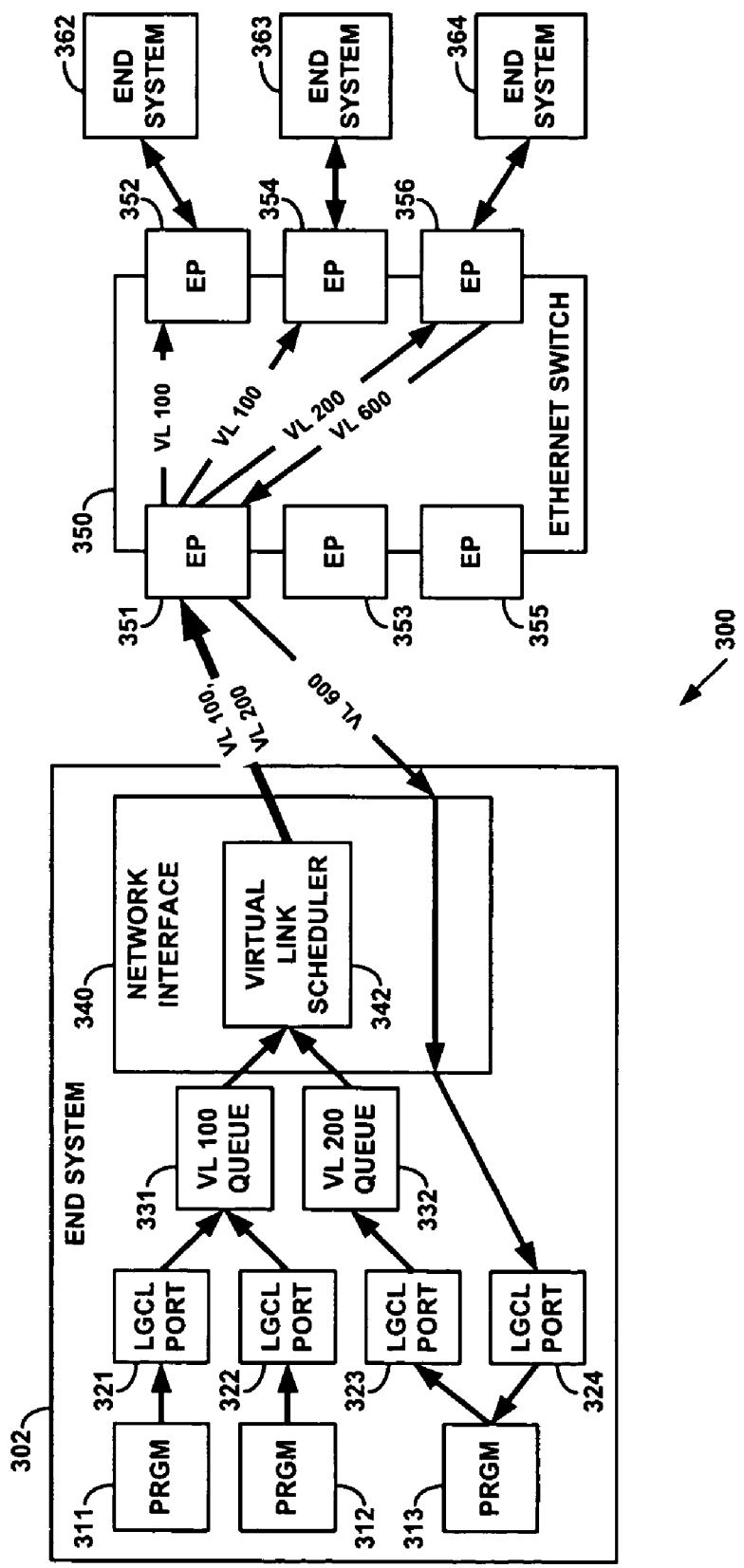
FIG. 3 is a simplified representation of an Ethernet-based Avionics Full-Duplex (AFDX) network in which low-jitter transmission of packets may be carried out.

A simplified representation of an AFDX system is depicted in FIG. 3. Illustrated as network 300 in the figure, the representative AFDX system includes an Ethernet switch 350, and four representative end systems 302, 362, 363, and 364. Ethernet switch 350 further comprises six Ethernet ports, EP 351, 352, 353, 354, 355, 356. As shown by way of example, end system 302 is connected to EP 351, end system 362 is connected to EP 352, end system 363 is connected to EP 354, and end system 364 is connected to EP 356. Also by way of example, EPs 353 and 353 are not connected to any end systems or devices. It should be understood that other configurations are possible, including more or fewer switch port on the Ethernet switch, more or fewer end systems, and different connections. Additionally, there could be other switches present in network 300.

For purposes of illustration, end system 302 is shown in greater detail than the other end systems, the details being relevant to the operation of the present invention in an AFDX system. It should be understood that other end systems, including the ones shown in FIG. 3, will preferably comprise functional elements similar to those shown in end system 302. By way of example, end system 302 comprises three programs, PRGM 311, 312, and 313. Each could comprise software instructions executable on the processor of the end system, for example. The exact purpose of each program is not specified herein, but could include such functions as synchronization, or hardware interface control (e.g., affecting a wing surface of an aircraft).

Each of the programs is, in turn, associated with one or more logical ports, LGCL PORT 321, 322, 323, and 324. Logical ports preferably provide a means for associating data that are communicated to and/or from the network with particular programs (or other executable entities). By way of example, PRGM 311 provides input to LGCL PORT 321, and PRGM 312 provides input to LGCL PORT 322. Also by way of example, PRGM 313 provides input to LGCL PORT 323, and receives output from LGCL PORT 324.

Continuing with exemplary end system 302, LGCL PORTs 321 and 322 each feed data from their respective programs to virtual link 100 by way of VL 100 Queue 331. Similarly, LGCL PORT 323 feeds VL 200 Queue 332. Each of VL 100 Queue 331 and VL 200 Queue 332, in turn, feed Virtual Link Scheduler 342, shown by way of example to be a component of Network Interface 340. In addition to queuing packets from the respective logical port, each VL queue also ensures adherence to the allowed transmission rate of its associated virtual link when feeding the Virtual Link Scheduler 342.

From Virtual Link Scheduler 342, Ethernet packets are transmitted by Network Interface 340 to EP 351 (in this example) of Ethernet switch 350. As indicated by the arrow in FIG. 3 from the Virtual Link Scheduler 342 to EP 351 labeled "VL 100, VL 200," both VL 100 and VL 200 share the same physical link between the network interface and the switch. Note that there may be other Ethernet packets transmitted to EP 351 besides the ones on VL 100 and 200.

In the exemplary network of FIG. 3, packets arriving at EP 351 on VL 100 are switched to EP 352 and EP 354 for output transmission to end systems 362 and 363, respectively. Similarly, packets arriving at EP 351 on VL 200 are switched to EP 356 for output to end system 364. Further, although not shown in detail, end system 364 is the source for VL 600, which carries packets that are switched from EP 356 to EP 351 en route to end system 302. These exemplary port mappings are indicated by the labeled arrows between the ports of Ethernet switch 350. Also, note that packets arriving at end system 302 on VL 600 are directed PRGM 313 by way of LGCL PORT 324 in this example.

As discussed above, an AFDX system may, by design, incorporate expedited switching and provide certain requisite performance characteristics. However, it may not be able to ensure minimal transmission jitter through the switch. In accordance, then, with an embodiment of the present invention, transmission times determined from a global schedule as described above may be used by Virtual Link Scheduler 342 in order to eliminate (or at least reduce) jitter in the switch or switches of an AFDX system. Preferably, the global schedule will comprise a sequence of transmission times that are respectively distinct. The virtual link scheduler of each end system will then be provided with a set of transmission times selected from the global schedule in such a way as avoid duplicate selections among end systems. The virtual link scheduler on a given end system may then use its set of transmission when it submits a real-time packet to the network interface for transmission. In this way, real-time packets transmitted on virtual links will experience little or no queuing delays as they traverse the network switch (or switches), and consequently will suffer little or no transmission jitter.

In further accordance with the preferred embodiment, the global schedule of transmission times may be determined based on time offsets within a hyperperiod, as described above. Additionally, the global schedule may be generated, and the per-end-system time selections made, as part of the process of network configuration. For example, the duration of the hyperperiod and the number offsets (and the implied offset increment) may be determined according to the number of end system and the timing requirements of the various applications and associated real-time messages. Each virtual link scheduler may then be provided with one or more offsets from the global schedule, where, again, duplication among end systems is avoided. The offsets may be provided to each virtual link scheduler in a data file, for example, although other arrangements are possible.

As a possible alternative to implementing transmission time scheduling in the virtual link scheduler, the transmission time scheduling by each respective end system could instead be enabled in the Ethernet protocol stack of the network interface of each respective end system. For example, transmission scheduling could be implemented within a shim in the stack, wherein the set of transmission times controls a transmission-gating process. In this embodiment, transmission time scheduling could apply to all packet transmissions, and not just to virtual link transmissions. Alternatively, the shim could include the capability apply gating to VL traffic only. Other arrangements are possible as well.

Additionally it should be noted that AFDX systems may also comprise redundant network elements for enhanced reliability. In such a configuration, the virtual link scheduler may have two possible routes for each transmitted packet, corresponding to a primary and a backup network. While the method of transmitting packets according to a set of transmission times has been described for just a single network, the method could easily be adapted to a configuration that includes redundant networks.

Note further that while the exemplary operation of transmission time scheduling by end systems in an AFDX system has been described with respect to real-time packets transmitted on virtual links, it may also be applied to real-time packets that are not transmitted on virtual links, and to non-real-time packets as well. Further, packet transmissions that are not subject to transmission time scheduling may be present in the network switch when scheduled packets arrive. If such an unscheduled packet is in the process of transmission when a scheduled packet arrives at the switch, then the scheduled packet may experience an associated delay. Otherwise, unscheduled packets could be placed in a low-priority queue, such that scheduled packets would be processed ahead of any queued, unscheduled packets. As an alternative, transmission of a newly-arrived real-time packet could preempt the in-progress transmission of a non-real-time (unscheduled) packet.

Exemplary System Implementation

Figure 4:
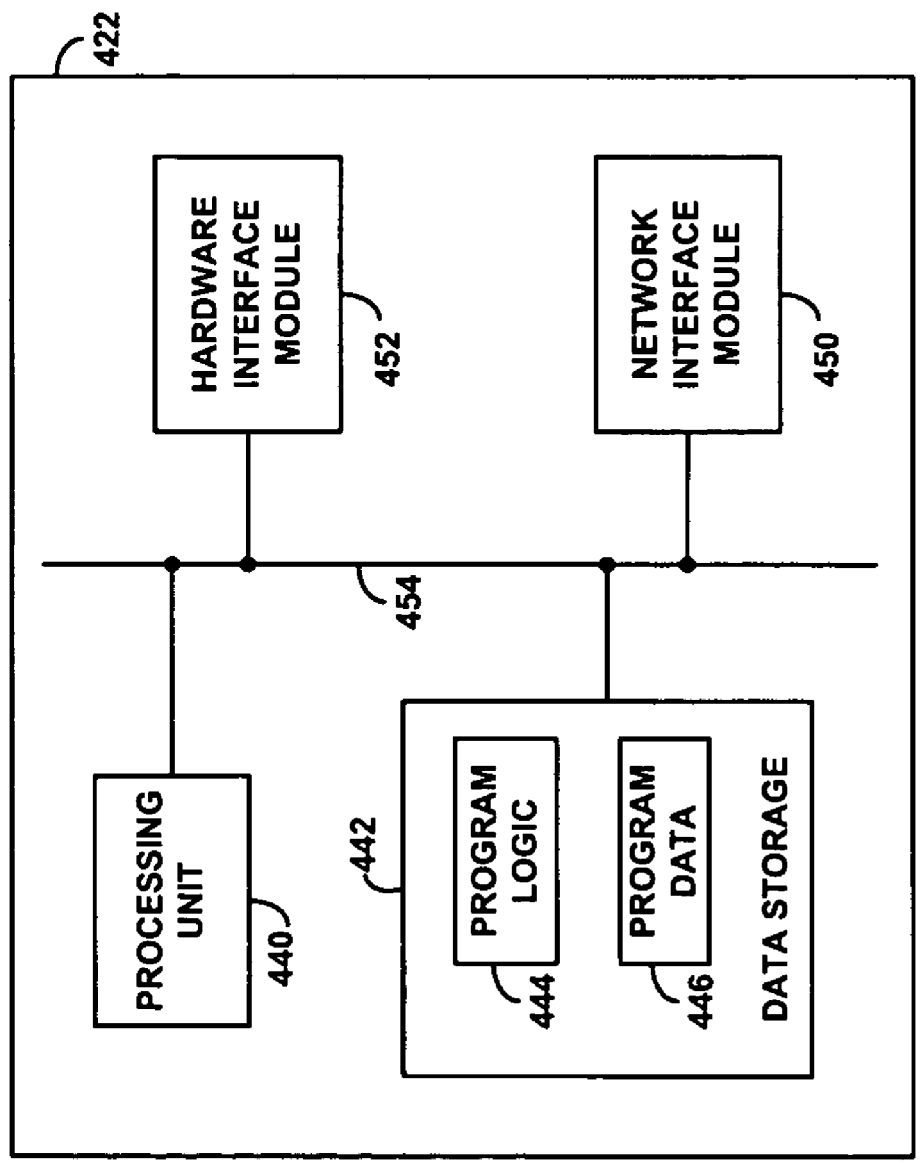
FIG. 4 is simplified representation of an end system that may carry out transmission of real-time packets according to a set of predetermined transmission times, including time offsets within a global hyperperiod.

FIG. 4 is a simplified block diagram depicting functional components of an example end system 422, arranged to carry out its functions. As shown in FIG. 4, exemplary end system 422, representative of end system 302 FIG. 3, for instance, includes, a processing unit 440, data storage 442, a network interface module 450, and a hardware interface module 452 all of which may be coupled together by a system bus 454 or other mechanism. In addition, the end system may also include external storage, such as magnetic or optical disk storage, although this is not shown in FIG. 4.

Network interface module 450 enables communication on a network, such as an AFDX or other packet-switched network. As such, network interface module 450 may take the form of an Ethernet network interface card that can be coupled with an Ethernet switch to a network such as network 300, for example. Alternatively, network interface module 450 may take other forms, providing for wired and/or wireless communication on a network or a subnet. Preferably, network interface module 450 incorporates functionality to transmit packet data according to a set of one or more transmission times, as described above.

Hardware interface module 452 enables communication with, and possibly control of, external hardware components, such as actuators, input devices, or measuring devices. As such, hardware interface module 452 may take the form of a hardware interface controller that incorporates standards-compliant and/or customized communication links with the external hardware, and also incorporates functional elements for exchanging data and commands with processing unit 440 via system bus 454, for example.

Processing unit 440 comprises one or more general purpose processors and/or one or more special purpose processors, and preferably incorporates a clock for timing of internal and external events. Data storage 442 comprises one or more volatile and/or non-volatile storage components, which can be integrated in whole or in part with processing unit 440. As further shown, data storage 442 is equipped to hold program logic 444 and program data 446. Program logic 444 preferably comprises machine language instructions that are executable by processing unit 440 to carry out various functions described herein. Program data 446 preferably comprises various data and variables that may be used in the course of program execution. As an example, program data may comprise one or more transmission times used to determine when data packets may be transmitted on the network.

By way of example, the program logic 444 may be executable by processing unit 440 to generate a real-time message, and then pass the message to network interface module 450 for transmission to another end system in the network. As another example, program logic 444 may be executable by processing unit 440 to generate a command and then pass it to hardware interface module 452 in order to affect an action on the associated external hardware component.

According to a preferred embodiment, program logic 444 may comprise a logical component of a distributed synchronization algorithm. Processing unit 440, operating according the instructions of the program logic, may generate a time-synchronization message, insert a time stamp into the message, and then pass the message to network interface module 452 for transmission to another end system. Network interface module 452 may then transmit the time-synchronization message according to a time selected from a set of times stored either in the network interface module or in program data 446.

One skilled in the art will recognize that the operation of end system 422 with respect to transmitting packets according to one or more transmission times, as well as other aspects of operation described herein, could be put into practice in numerous ways. The examples above are not intended to limit the scope of the invention.

CONCLUSION

An exemplary embodiment of the present invention has been described above. Those skilled in the art will understand, however, that changes and modifications may be made to the embodiment described without departing from the true scope and spirit of the invention, which is defined by the claims.

What is claimed:

1. A method of increasing the precision of time synchronization among a plurality of host nodes in a packet-switched communication network by reducing transmission delay variation in the communication network, each host node having a clock, the method comprising the following steps carried out at each respective host node of the plurality of host nodes:

synchronizing the clock at the respective host node with the clock at each other host node of the plurality of host nodes;

providing to the respective host node a distinct set of transmission times for transmitting messages on the communication network, wherein the distinct set of transmission times comprises at least one time selected from a global schedule of transmission times, the selection being made in such a manner as to avoid concurrent transmission of messages by the plurality of host nodes;

executing at the respective host node a time-synchronization program operable to adjust the clock at the respective host node, to generate a time-synchronization message, and to cause the respective host node to transmit the time-synchronization message via the communication network to at least one other host node of the plurality of host nodes according to a transmission time selected from the distinct set of transmission times provided to the respective host node; and receiving at the respective host node at least one other time-synchronization message transmitted from at least one other host node of the plurality of host nodes, and in turn delivering the received at least one other time-synchronization message to the time-synchronization program executing at the respective host node.

2. The method of claim 1, wherein the each host node is selected from the group consisting of a client device and a server device.

3. The method of claim 2, wherein executing the time-synchronization program comprises executing a distributed algorithm.

4. The method of claim 3, wherein the global schedule of transmission times comprises (i) a periodic transmission cycle of predetermined period and start time, and (ii) a series of time offsets referenced from the start time, each offset being smaller than the period, and wherein providing to the respective host node a distinct set of transmission times further comprises:

providing to the respective host node the start time and at least one time offset selected from the series of time offsets, wherein the selection is made so as to avoid duplicate selections of time offsets among the plurality of host nodes.

5. The method of claim 3, wherein the time-synchronization message includes at least one time stamp and information indicative of the transmission time.

6. The method of claim 3, wherein the distributed algorithm implements time-synchronization procedures according to a standard selected from the group consisting of Network Time Protocol (NTP) and IEEE 1588.

7. The method of claim 2, wherein at least one host node is communicatively coupled to an external time server, and wherein executing the time-synchronization program on the at least one host node that is communicatively coupled to the external time server further comprises acquiring a global time from the external time server.

8. The method of claim 7, wherein the external time server is associated with a Global Positioning System (GPS) system.

9. The method of claim 2, wherein the packet-switched communication network is an Ethernet-based network, including at least one Ethernet switch.

10. A method of reducing transmission delay variation of packet transmissions among a plurality of host nodes in a packet-switched communication network, each host node having a clock, the method comprising the following steps carried out at each respective host node of the plurality of host nodes:

synchronizing the clock at the respective host node with the clock at each other host node of the plurality of host nodes;

providing to the respective host node a distinct set of transmission times for transmitting packets on the communication network, wherein the distinct set of transmission times comprises at least one time from a global schedule of transmission times, the selection being made in such a manner as to avoid concurrent transmission of packets by the plurality of host nodes;

executing at the respective host node a program operable to generate a packetized message, and to cause the respective host node to transmit the packetized message via the communication network to at least one other host node of the plurality of host nodes according to a transmission time selected from the distinct set of transmission times provided to the respective host node; and receiving at the respective host node at least one other packetized message transmitted from at least one other host node of the plurality of host nodes.

11. The method of claim 10, wherein the each host node is selected from the group consisting of a client device and a server device.

12. The method of claim 11, wherein the global schedule of transmission times comprises (i) a periodic transmission cycle of predetermined period and start time, and (ii) a series of time offsets referenced from the start time, each offset being smaller than the period, and wherein providing to the respective host node a distinct set of transmission times further comprises:

providing to the respective host node the start time and at least one time offset selected from the series of time offsets, wherein the selection is made so as to avoid duplicate selections of time offsets among the plurality of host nodes.

13. The method of claim 11, wherein the packet-switched communication network is an Ethernet-based network, including at least one Ethernet switch.

14. A system for reducing transmission delay variation of packet transmissions in a packet-switched communication network, the system comprising:

a plurality of host nodes, each comprising a processor, a clock, data storage, and a network interface module for communicating data on the packet-switched network, wherein (i) the plurality of host nodes are communicatively coupled via the packet-switched network, (ii) the clock on each respective host node is synchronized with the clock on each other host node of the plurality of host nodes, and (iii) each host node is selected from the group consisting of a client device and a server device; and in each respective host node of the plurality of host nodes:

a distinct set of transmission times stored in the data storage of the respective host node and usable by the respective host node for determining times at which to transmit packets on the communication network, wherein the distinct set of transmission times comprises at least one time selected from a global schedule of transmission times, the selection being made in such a manner as to avoid concurrent transmission of packets by the plurality of host nodes;

a program stored in the data storage of the respective host node and executable on the processor of the respective host node, and operable to generate a packetized message, and to cause the respective host node to transmit the packetized message via the communication network to at least one other host node of the plurality of host nodes according to a transmission time selected from the distinct set of transmission times;

data-reception software stored in the data storage of the respective host node and executable on the processor of the respective host node, operable, in coordination with the network interface module of the respective host node, to receive at the respective host node at least one other packetized message transmitted from at least one other host node of the plurality of host nodes.

15. The system of claim 14, wherein the global schedule of transmission times comprises (i) a periodic transmission cycle of predetermined period and start time, and (ii) a series of time offsets referenced from the start time, each offset being smaller than the period, and wherein the distinct set of transmission times stored in the data storage of the respective host node further comprises the start time and at least one time offset selected from the series of time offsets, the selection being made so as to avoid duplicate selections of time offsets among the plurality of host nodes.

16. The system of claim 14, wherein:
- the program comprises a time synchronization program further operable to adjust the clock at the respective host node, and the packetized message is a time-synchronization message;
- the received at least one other packetized message transmitted from the at least one other host node of the plurality of host nodes is another time-synchronization message;
- the data-reception software on the respective host is further operable to deliver the other time-synchronization message to the time-synchronization program executing on the processor of the respective host node; and
- the time-synchronization program comprises a distributed algorithm.

17. The system of claim 16, wherein the time-synchronization message includes at least one time stamp and information indicative of the transmission time.

18. The system of claim 16, wherein the distributed algorithm implements time-synchronization procedures according to a standard selected from the group consisting of Network Time Protocol (NTP) and IEEE 1588.

19. The system of claim 16, wherein at least one host node is communicatively coupled to an external time server, and wherein the time-synchronization program on the at least one host node that is communicatively coupled to the external time server is further operable to acquire a global time from the external time server.

20. The system of claim 14, wherein the packet-switched communication network is an Ethernet-based network, including at least one Ethernet switch.

* * * * *